United States Patent
Kakikawa et al.

(10) Patent No.: US 8,273,168 B2
(45) Date of Patent: Sep. 25, 2012

(54) INK, INK JET RECORDING METHOD, INK CARTRIDGE, AND INK JET RECORDING APPARATUS

(75) Inventors: Hiroshi Kakikawa, Fujisawa (JP); Masako Udagawa, Kawasaki (JP); Shuichi Okazaki, Fujisawa (JP); Yuuhei Shimizu, Kawasaki (JP); Hideyuki Takai, Yokohama (JP); Shinichi Hakamada, Kawasaki (JP); Kouhei Nakagawa, Kawasaki (JP); Hideki Takayama, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 334 days.

(21) Appl. No.: 12/700,604

(22) Filed: Feb. 4, 2010

(65) Prior Publication Data

US 2010/0201769 A1 Aug. 12, 2010

(30) Foreign Application Priority Data

Feb. 5, 2009 (JP) ................................. 2009-024617
Jan. 13, 2010 (JP) ................................. 2010-004869

(51) Int. Cl.
*C09D 11/02* (2006.01)
(52) U.S. Cl. .................................. 106/31.65; 106/31.86
(58) Field of Classification Search ............... 106/31.65, 106/31.86
See application file for complete search history.

(56) References Cited

U.S. PATENT DOCUMENTS

| | | | |
|---|---|---|---|
| 4,895,949 A | 1/1990 | Jaffe et al. | |
| 7,553,883 B2 | 6/2009 | Yatake | |
| 2008/0028981 A1 | 2/2008 | Mizushima et al. | |
| 2008/0160209 A1* | 7/2008 | Takabayashi | 427/511 |
| 2009/0297716 A1* | 12/2009 | Koganehira et al. | 427/288 |
| 2009/0297790 A1* | 12/2009 | Sato et al. | 428/195.1 |

FOREIGN PATENT DOCUMENTS

| | | |
|---|---|---|
| EP | 0776952 B1 | 1/2001 |
| EP | 1146094 | 10/2001 |
| EP | 1215251 | 6/2002 |
| EP | 1416020 | 8/2007 |
| EP | 1967558 | 9/2008 |
| JP | S60-035055 A | 2/1985 |
| JP | H02-038463 A | 2/1990 |
| JP | H10-219166 A | 8/1998 |
| JP | H11-029728 A | 2/1999 |
| JP | 2003-128955 A | 5/2003 |
| JP | 2004-175880 A | 6/2004 |
| JP | 2006-002141 A | 1/2006 |

(Continued)

OTHER PUBLICATIONS

U.S. Appl. No. 12/699,695, filed Feb. 3, 2010.

(Continued)

*Primary Examiner* — Melvin C Mayes
*Assistant Examiner* — Veronica F Faison
(74) *Attorney, Agent, or Firm* — Canon U.S.A., Inc., IP Division

(57) ABSTRACT

An ink contains at least a pigment, wherein the pigment is a solid solution of C.I. Pigment Red 202 and C.I. Pigment Violet 19, and a primary particle diameter D (nm) of the pigment and a 50%-cumulative diameter $D_{50}$ (nm) in particle diameter distribution of the pigment satisfy a relation of $D \times 0.95 \leq (=<) D_{50} \leq (=<) 130$, and a 90%-cumulative diameter $D_{90}$ (nm) in particle diameter distribution of the pigment and the 50%-cumulative diameter $D_{50}$ (nm) satisfy a relation of $1.5 \leq (=<) D_{90}/D_{50} \leq (=<) 2.2$.

8 Claims, 1 Drawing Sheet

FOREIGN PATENT DOCUMENTS

| | | |
|---|---|---|
| JP | 2006-282802 A | 10/2006 |
| JP | 2006-282810 A | 10/2006 |
| JP | 2007-161850 | 6/2007 |
| JP | 2008-285522 A | 11/2008 |
| WO | WO 2007058245 A1 * | 5/2007 |
| WO | 2008-075765 | 6/2008 |
| WO | 2008-075765 A1 | 6/2008 |

OTHER PUBLICATIONS

XP-002582006, Database CAPLUS (Online), Chemical Abstracts Service, Columbus, Ohio, US; Jun. 28, 2007, Nakamura, Masaki, "Pigment-based aqueous in composition using radiation-crosslinkable hydrophilic sie-chain-containing resin,and ink-jet printing method".

XP-002582031, Database accession No . 2007 :697672, -& Database WPI Week 200751 Thomson Scientific , London , GB; AN, 2007-520036, -& JP 2007 161850 A (Konica Corp), Jun. 28, 2007.

David Savastano, "The Pigment Report", Ink World Magazine, Mar. 2007.

Third party Observation, "Ink, ink jet recording method, ink cartridge, and ink jet recording apparatus", Publication No. EP2216375.

Third Party Observation, Publication No. EP2216375.

* cited by examiner

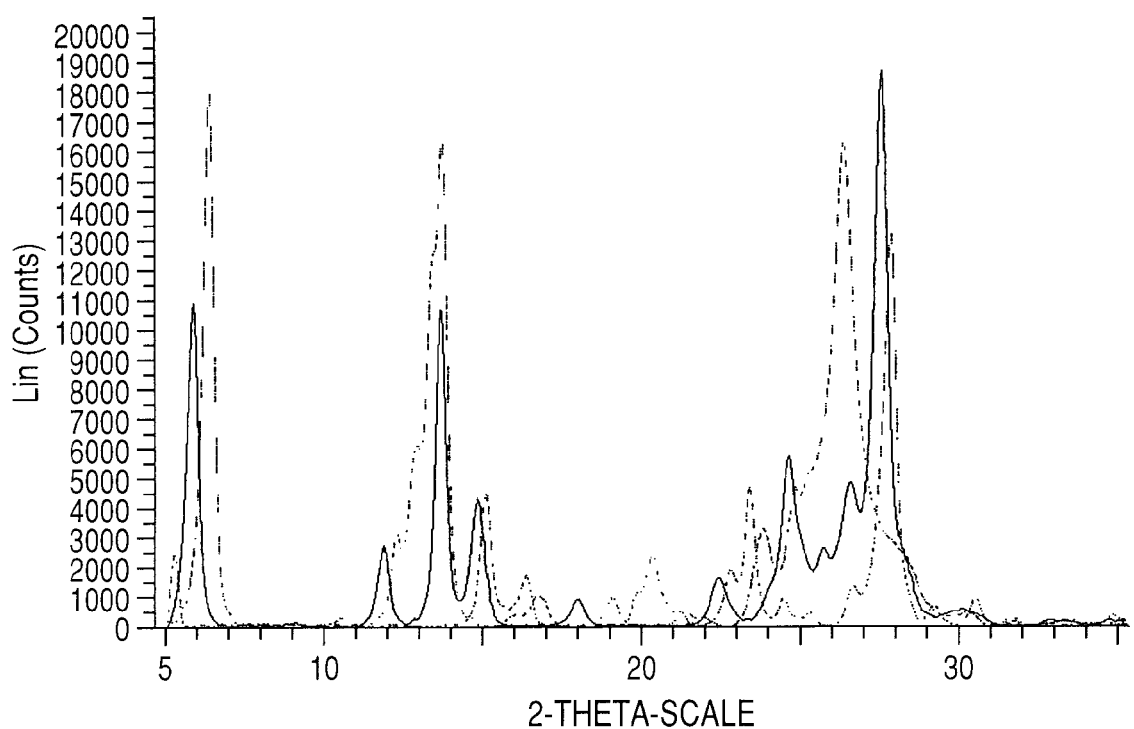

INK, INK JET RECORDING METHOD, INK CARTRIDGE, AND INK JET RECORDING APPARATUS

BACKGROUND OF THE INVENTION

1. Field of the Invention

The present invention relates to an ink containing a solid solution of C.I. Pigment Red 202 and C.I. Pigment Violet 19 which are respectively a quinacridone pigment; an ink jet recording method, an ink cartridge, and an ink jet recording apparatus employing the ink.

2. Description of the Related Art

For recording of full-color images, generally are used a combination of four inks of subtractive three primary colors (yellow, magenta, and cyan) and a black color. To improve fastness properties of the image recorded by an ink jet recording method, inks (pigment inks) containing a pigment are widely used as the coloring material.

Lately, the quality of the image obtained by ink jet recording method has been highly improved, and is demanded to be nearly at the same level as the image obtained by silver-halide photography. For example, the image recorded with a pigment ink on a highly glossy recording medium (a glossy paper) tends to lower the glossiness. The glossiness of the recorded image is demanded not to be lowered with the color reproduction range kept broader.

In particular, the human visual sensation is very sensitive to the image in a red color region recorded with a magenta ink. Many techniques are disclosed for improving the color development of the image recorded with a magenta ink. Pigments used for the ink jet magenta ink are disclosed, for example, a solid mixture of C.I. Pigment Red 202 and C.I. Pigment Violet 19 (Japanese Patent Application Laid-Open No. H10-219166, Japanese Patent Application Laid-Open No. H11-029728, Japanese Patent Application Laid-Open No. 2006-282802, Japanese Patent Application Laid-Open No. 2006-282810, Japanese Patent Application Laid-Open No. 2008-285522).

Further for improving the color development of the recorded image, without limitation to the magenta inks, the particle size of the pigment and ratio of the primary particle size to the secondary particle size are defined (Japanese Patent Application Laid-Open No. 2004-175880, Japanese Patent Application Laid-Open No. 2006-002141).

As described above, no conventional magenta ink is capable of reproducing a color in the red region in the same quality as in silver-halide photography with high ink-storage stability without decrease of the glossiness.

SUMMARY OF THE INVENTION

The present invention intends to provide an ink which has high storage stability and is capable of recording a glossy image on a glossy paper with high color reproducibility in the red color region in a broader color reproduction range. The present invention intends to provide also an ink jet recording method, an ink cartridge, and an ink jet recording apparatus for recording stably a glossy image with color reproducibility in a red color region at the same high level as in the silver-halide photography.

The present invention is directed to an ink containing a pigment, wherein the pigment is a solid solution of C.I. Pigment Red 202 and C.I. Pigment Violet 19, and a primary particle diameter D (nm) of the pigment and a 50%-cumulative diameter $D_{50}$ (nm) in particle diameter distribution of the pigment satisfy a relation of $D \times 0.95 \leq (=<) D_{50} \leq (=<) 130$, and a 90%-cumulative diameter $D_{90}$ (nm) in particle diameter distribution of the pigment and the 50%-cumulative diameter $D_{50}$ (nm) satisfy a relation of $1.5 \leq (=<) D_{90}/D_{50} \leq (=<) 2.2$.

According to the present invention, there is provided an ink which has high storage stability and is capable of recording a glossy image on a glossy paper with high color reproducibility in a red color region in a broader color reproduction range. Further, according to the present invention, there are provided an ink jet recording method, an ink cartridge, and an ink jet recording apparatus for recording a glossy image stably with color reproducibility in a red color region at the same high level as in the silver-halide photography.

Further features of the present invention will become apparent from the following description of exemplary embodiments with reference to the attached drawing.

BRIEF DESCRIPTION OF THE DRAWINGS

The FIGURE is an X-ray diffraction pattern of the pigment powder.

DESCRIPTION OF THE EMBODIMENTS

Preferred embodiments of the present invention will now be described in detail in accordance with the accompanying drawings.

In the description below, the solid solution of the plural pigments is occasionally referred to simply as the pigment.

The inventors of the present invention studied use of quinacridone pigments and solid solutions thereof, which are widely used as a coloring material in ink jet recording, for increasing the chroma and glossiness of the image recorded with a magenta ink. Thereby, it was found that use of a solid solution of C.I. Pigment Red 202 and C.I. Pigment Violet 19 as the pigment enables improvement of the chroma and glossiness of the formed image. However, the solid solution of the pigments can not readily be kept stable in a dispersion state in comparison with usual magenta pigments.

Therefore, the inventors of the present invention studied the optimum dispersion conditions for keeping stable the ink containing the above solid solution for a long term, that is, for improving the storage stability of the ink. Thereby the inventors of the present invention have found that the ink storage stability can be remarkably improved and the chroma and glossiness of the recorded image can be improved under the two conditions below, and have completed the present invention.

One of the conditions for achieving the above effects with an ink containing a solid solution of C.I. Pigment Red 202 and C.I. Pigment Violet 19 (hereinafter simply referred to as a pigment, occasionally) is that the average diameter of the pigment particles (secondary particles) in a state existing in the ink is made smaller, and the primary particles of the pigment is kept undamaged as much as possible. Specifically, in the ink containing the pigment (solid solution), the primary particle diameter D (nm) of the pigment and the 50%-cumulative diameter $D_{50}$ (nm) of the particle diameter distribution should satisfy the relation of $D \times 0.95 \leq (=<) D_{50} \leq (=<) 130$.

The other one of the conditions for achieving the above effects is that the particle diameter distribution of the pigment (solid solution) in the ink is made narrower or made uniform. Specifically, the ratio of the 90%-cumulative diameter $D_{90}$ (nm) to 50%-cumulative diameter $D_{50}$ (nm) in particle diameter distribution of the pigment should satisfy the relation of $1.5 \leq (=<) D_{90}/D_{50} \leq (=<) 2.2$.

In the present invention, the term "average particle diameter" refers to the average of the diameters of the pigment particles (secondary particles) in the state existing in the ink. The term "primary particle diameter" in the present invention refers to a particle diameter of the minimum unit of the pigment particles. Therefore, the particle diameter distribution of the pigment in the present invention refers to the particle diameter distribution of the pigment in a state existing in the ink. Incidentally, the 50%-cumulative diameter $D_{50}$ (nm) in particle diameter distribution of the pigment and the 90%-cumulative diameter $D_{90}$ (nm) thereof are occasionally referred to simply as $D_{50}$, and $D_{90}$ respectively. In a state in the ink, the pigment particle of the small particle diameter can be formed from one primary particle. In this case the primary particle diameter and the secondary particle diameter are the same.

Under the above two conditions, the pigment is dispersed stably in the ink to improve the storage stability of the ink, and the chroma and glossiness of the recorded image are improved. The inventors of the present invention consider the reason as below.

Firstly the reason is described below why the above relation between the average particle diameter of the pigment and the primary particle diameter of the pigment affects greatly the storage stability of the pigment and the chroma and glossiness of the recorded image. Generally, the decrease of the average particle diameter of the pigment is known to be effective for improving the chroma and glossiness of the recorded image. Actually the inventors of the present invention confirmed that the decrease of the average particle diameter $D_{50}$ decreases the light scattering by the image recorded on a recording medium and improves the chroma and glossiness of the recorded image.

However, the inventors of the present invention found that the smaller average particle diameter of the pigment can not necessarily improve the storage stability of the ink significantly. The inventors investigated the reason for this. The impact force or shearing force applied to the pigment for pulverization will distort the crystal structure of the pigment to make the pigment particles instable to cause particle aggregation and to impair the long-term storage stability of the ink. On the other hand, when the average particle diameter of the pigment is excessively large in comparison with the primary particle diameter of the pigment, light scattering in the recorded image is influential to impair the chroma and glossiness of the recorded image.

From the above reason, for satisfying the storage stability of the ink containing a solid solution of C.I. Pigment Red 202 and C.I. Pigment Violet 19 (pigment) and for improving the chroma and glossiness of the recorded image, the primary particle diameter D (nm) of the pigment and the 50%-cumulative diameter $D_{50}$ (nm) of the particle diameter distribution should satisfy the relation of $D \times 0.95 \leq (=<) D_{50} \leq (=<) 130$. At $D_{50}$ more than 130, the desired chroma and glossiness are not obtained, whereas at $D_{50}$ less than $D \times 0.95$, the storage stability of the ink are not achievable. Further the average particle diameter distributes, and the broader distribution at the smaller particle diameter side can affect the storage stability of the ink. Therefore, for further improvement of the ink storage stability, the relation of $D \times 1.55 \leq (=<) D_{50}$, or $D \times 1.9 \leq (=<) D_{50}$ is preferred. The ink of the diameter $D_{50}$ less than 1.55 may be not stable in storage, and not capable of keeping stable the ejection of the ink in a thermal type ink jet system.

Next, the relation of the particle diameter distribution of the pigment (solid solution of C.I. Pigment Red 202 and C.I. Pigment Violet 19) with the chroma and glossiness of the recorded image will be described. Based on the results of the above study, the inventors of the present invention investigated on the method for dispersing the pigment to satisfy the relation between the primary particle diameter D (nm) and the aforementioned 50%-cumulative particle diameter of the pigment: $D \times 0.95 \leq (=<) D_{50} \leq (=<) 130$. In the course of the investigation, it was found that, the chroma and glossiness of the pigment can vary even when the relation between the primary particle diameter and $D_{50}$ of the pigment is not varied. Specifically, even with the same relation between the primary particle diameter and the $D_{50}$ of the pigment, the pigment having a narrower particle diameter distribution improves the chroma and glossiness of the recorded image. As the result of the investigation thereon, the chroma and glossiness of the recorded image depend greatly on the surface state of the pigment layer formed on the recording medium. For higher chroma and higher glossiness of the image, the pigment layer should be made flat and smooth. The inventors of the present invention found that a pigment having a narrower particle size distribution can deposit in a higher density to form a flat pigment layer. Thereby the pigments having the same average particle diameter can become different in the smoothness of the pigment layer depending on the particle diameter distribution to cause difference in the chroma and glossiness of the recorded image.

Further, in addition to the above requirement, for satisfying the storage stability of the ink containing the pigment and for improving the chroma and glossiness of the recorded image, the ratio of the 90%-cumulative diameter $D_{90}$ (nm) to 50%-cumulative diameter $D_{50}$ (nm) the pigment should satisfy at least the relation of $D_{90}/D_{50} \leq (=<) 2.2$. According to the findings of the inventors of the present invention, the lower the ratio of $D_{90}/D_{50}$, the more are the chroma and glossiness of the recorded image improved. However, the $D_{90}/D_{50}$ ratio less than 1.5 is not preferred in view of the cost and number of preparation steps of the pigment dispersion liquid. On the other hand, the pigment having the ratio of $D_{90}/D_{50}$ more than 2.2 is not preferred since such a pigment will not give the desired chroma and glossiness of the recorded image. In consideration of the above matters, the ink of the present invention should satisfy the relation of $1.5 \leq (=<) D_{90}/D_{50} \leq (=<) 2.2$.

In short, for satisfactory ink storage stability of the ink, for the higher glossiness of an image recorded on a glossy paper, and for a broader color reproduction range in the red region, the pigment in the ink should satisfy the two conditions below. Specifically, in the ink containing the solid solution of the pigments, the primary particle diameter D (nm) of the pigment and the 50%-cumulative diameter $D_{50}$ (nm) of the particle diameter distribution should satisfy the relation of $D \times 0.95 \leq (=<) D_{50} \leq (=<) 130$, and the ratio of the 90%-cumulative diameter $D_{90}$ (nm) to the 50%-cumulative diameter $D_{50}$ (nm) in particle diameter distribution of the pigment should satisfy the relation of $1.5 \leq (=<) D_{90}/D_{50} \leq (=<) 2.2$.

The primary particle diameter D (nm) in the present invention is determined as described below. A pigment-dispersion liquid or an ink is diluted suitably with pure water, and the diameters of 100 or more of the minimum unit particles constituting the pigment particles are measured for the primary particle diameter by transmission electron microscopy or scanning electron microscopy, with image processing if necessary, and the measure diameters are averaged. More specifically, a primary particle diameter of one primary particle is determined by measuring a short axis diameter B (nm) and a long axis diameter L (nm), and (B+L)/2 is taken as the diameter of the primary particle. The individual primary particle diameters of 100 or more particles are measured and are averaged to obtain the average primary particle diameter. Incidentally, when one pigment particle is constituted of one primary particle, the diameter of this pigment particle is considered to be equal to the diameter of the primary particle. In the Examples described later, the primary particle diameter is measured by Hitachi ultra-high-performance scanning electron microscope SU-70 (Hitachi High Technologies Co.) as the scanning electron microscope. In the present invention, the 50%-cumulative diameter (nm) and 90%-cumulative diameter (nm) in the pigment particle diameter distribution correspond respectively to the average particle diameter based on the volume, namely the volume-average particle diameter. The diameters of $D_{50}$ and $D_{90}$ can be measured, for example, by a dynamic light-scattering type of particle distribution tester, but is not limited thereto. In Examples described later, $D_{50}$ and $D_{90}$ were measured by Nano-Track UPA150EX (Nikkiso Co.) as the dynamic light-scattering type of particle distribution tester.

The difference of the present invention having essentially the above constitution from prior art techniques is described below. As mentioned in Description of the Related Art, many disclosures have been made on pigment inks using a solid solution of plural pigments like the ones used in the present invention (Japanese Patent Application Laid-Open No. H10-219166, Japanese Patent Application Laid-Open No. H11-029728, Japanese Patent Application Laid-Open No. 2006-282802, Japanese Patent Application Laid-Open No. 2006-282810, Japanese Patent Application Laid-Open No. 2008-285522). However, none of the disclosures describes the relation, as defined in the present invention, between the average particle diameter in the pigment dispersion liquid and the primary particle diameter of the pigment. They have also no description as to the relation between the 90%-cumulative particle diameter and the 50%-cumulative particle diameter of the dispersed particles.

For example, Japanese Patent Application Laid-Open No. H10-219166 and Japanese Patent Application Laid-Open No. H11-029728 describe a pigment ink employing a solid solution of C.I. Pigment Red 202 and C.I. Pigment Violet 19. However, these documents intend to improve color developability or an optical density of the image, and conduct dispersion without decreasing the average particle diameter of the pigment. Therefore the pigment does not satisfy the relation between the diameter $D_{50}$ and the primary particle diameter defined in the present invention and cannot give sufficient chroma and glossiness of the recorded image.

Similarly to the above Japanese Patent Application Laid-Open No. H10-219166 and Japanese Patent Application Laid-Open No. H11-029728, Japanese Patent Application Laid-Open No. 2006-282802, Japanese Patent Application Laid-Open No. 2006-282810 and Japanese Patent Application Laid-Open No. 2008-285522, also describe inks containing a solid solution of C.I. Pigment Red 202 and C.I. Pigment Violet 19. However, as the result of the investigation by the inventors of the present invention, the method of the dispersion of these Patent Documents cannot give the ratio of $D_{90}/D_{50}$ less than 2.2 even though the average particle diameter of the pigment can be made smaller, and the chroma and glossiness of the image formed with the ink are found to be not sufficient.

On the other hand, as described in above-cited Japanese Patent Application Laid-Open No. 2004-175880, and Japanese Patent Application Laid-Open No. 2006-002141, the control of the particle diameter distribution has been investigated, regardless of the kinds of the pigments, such as the average particle diameter, the particle diameter distribution, and the ratio of the average primary particle diameter to the average secondary particle diameter.

Japanese Patent Application Laid-Open No. 2004-175880 defines the constituting ratio of particles in a limited particle diameter range, but does not describe the relation between the primary particle diameter and the dispersed particle diameter. The primary particle diameter herein refers to a diameter of the minimum unit of the particle distinguished clearly from other particles. The smaller diameter of the particle than the primary particle diameter indicates destruction of the pigment crystal. This impairs the dispersion stability of the pigment. For the dispersion stability, the dispersed particle diameter should be balanced with the primary particle diameter of the pigment. Japanese Patent Application Laid-Open No. 2006-002141 cited above describes the ratio of the average primary particle diameter to the average secondary particle diameter. The secondary particles are formed by aggregation of the primary particles existing in the dispersion liquid. Particle size testers measure the diameter of the secondary particles. However, according to the investigation by the inventors of the present invention, as described in Japanese Patent Application Laid-Open No. 2006-002141, with the average primary particle diameter controlled to be 50 nm or less, the interaction among the primary particles becomes stronger to make difficult the dispersion to decrease the dispersion stability of the pigment dispersion.

<Ink>

The constituents of the ink of the present invention are described below in detail.

(Pigment)

The pigment used in the present invention is a solid solution of C.I. Pigment Red 202 and C.I. Pigment violet 19. In the present invention, the "solid solution" signifies a pigment in which two or more pigments exist in a mixed crystal (crystallized in a mixed state), not a simple mixture of two or more pigments. The examples thereof are disclosed in Japanese Patent Application Laid-Open Nos. S60-35055 and H02-38463.

The formation of the solid solution of the two or more pigments can readily be identified by X-ray diffraction or a like method. A simple mixture of two or more pigments gives an X-ray diffraction pattern corresponding to superposition of the X-ray diffraction patterns of the component pigments, and the peak intensities correspond to the blending ratio of the respective pigments. On the other hand, a solid solution of two or more pigments gives an X-ray diffraction pattern which is different from those of the component pigments.

Pigments A-G used in Examples described later are solid solutions prepared as described below, being different in the primary particle diameter. The FIGURE shows powder X-ray diffraction patterns of C.I. Pigment Red 202 (broken line), C.I. Pigment Violet 19 (one-dot chain line), and the solid solution (Pigment A-G in Examples; solid line). In FIGURE, the abscissa denotes the incident angle (°), and the ordinate denotes the diffraction intensity. The solid solution was prepared by organic solvent treatment of the press cakes of C.I. Pigment Red 202 and of C.I. Pigment Violet 19 in a conventional manner as described in the patent documents cited above. As shown in the FIGURE, the powder X-ray diffraction pattern of the solid solution is different in the peak positions from the powder X-ray diffraction patterns of C.I. Pigment Red 202 and C.I. Pigment Violet 19. This shows that the substance indicated by the solid line in the FIGURE is not a pigment mixture but a solid solution of the pigments.

The primary particle diameter D (nm) of the pigment ranges preferably from 50 nm or more to 120 nm or less. The pigment having a primary particle diameter D of less than 50 nm has low lightfastness not to give lightfastness of the recorded image or requires a larger amount of a polymer for stabilization of the dispersion, disadvantageously. The polymer in a large amount in the ink will impair the smoothness of the recorded image and give insufficient chroma and glossiness of the recorded image. On the other hand, the pigment having a primary particle diameter D of more than 120 nm makes excessively large the average particle diameter of the pigment not to give satisfactory chroma and glossiness of the recorded image.

The content (mass %) of the pigment in the ink is preferably in the range from 0.1 mass % or more to 10.0 mass % or less, more preferably from 0.5 mass % or more to 5.0 mass % or less with respect to the total mass of the ink. Within the above range of the content of the pigment, both the image density of the recorded image and the ink ejection stability in the ink jet recording can be kept at higher levels.

(Polymer)

The ink of the present invention contains preferably a polymer, and can be prepared with a pigment dispersion liquid containing the specified pigment and a polymer. In the present invention, to solve the technical problems, in particular, in consideration of scratch resistance of the image recorded on a glossy paper, the pigment is dispersed preferably in a satisfactory state by a polymer. In the present invention, "a pigment dispersed by a polymer" includes not only polymer-dispersion type pigments which have a polymer adsorbed on the surface of the pigment particles but also the pigments mentioned below. Specifically, the pigments include polymer-bonding type self-dispersible pigments having an organic radical (polymer) having a polymer structure bonded chemically to the pigment surface, and microcapsule type pigments coated by an organic high polymer. As the results of the investigation by the inventors of the present invention, the polymer-dispersed pigments are the most suitable, and polymer-bonding type self-dispersible pigments are also preferred. This is because the polymer bonded chemically to the surface of the pigment particle stabilizes the dispersion.

The polymer for dispersing the pigment is formed by polymerization of a material containing a monomer like the ones mentioned below. The monomer for the polymer includes styrene, and α-methylstyrene; hydrophobic monomers having a carboxyl group such as n-butyl acrylate, n-hexyl acrylate, and benzyl methacrylate; hydrophilic monomers having a carboxyl group such as acrylic acid, methacrylic acid, crotonic acid, ethacrylic acid, propylacrylic acid, isopropylacrylic acid, itaconic acid, and fumaric acid; hydrophilic monomers having a sulfonic acid group such as styrenesulfonic acid, sulfonic acid-2-propylacrylamide, ethyl acrylic acid-2-suofonate, ethyl methacrylic acid-2-sulfonate, butylacrylamide-sulfonic acid; and hydrophilic monomers having a phosphonic acid group such as ethyl methacrylic acid-2-phosphonate, and ethyl acrylic acid-2-phosphonate.

The solid solution of two or more pigments like those employed in the present invention cannot readily be kept stably in a dispersion state in comparison with usual pigments. Therefore, in the present invention, for dispersing the pigment, a polymer formed by polymerization of a material containing at least an acrylic type monomer, an acrylic polymer, is used which is resistant to hydrolysis and capable of improving the dispersion stability. Further, a polymer is preferred which is formed by polymerization of a material containing a nonionic group such as an ethylene oxide group or a propylene oxide group or a mixture thereof, namely a polymer having a nonionic unit in the structure. In recording with the ink containing the pigment dispersed with the aid of the polymer, the aggregation of the pigment can be retarded effectively in comparison with the ink pigment dispersed by the polymer having no nonionic unit, and the glossiness of the recorded image can be improved remarkably.

In the present invention, for improving further the glossiness of the recorded image, the polymer has an acid value in the range preferably from 50 mgKOH/g or more to 300 mgKOH/g or less. Within the above range of the acid value, the surface of the recorded image is formed flatter and smoother to improve the glossiness of the image. The polymer having the acid value of less than 50 mgKOH/g can lower the dispersion stability of the pigment owing to electrostatic repulsion to increase the ink viscosity on recording of the image, resulting in a rough surface of the recorded image to lower the lower chroma and glossiness of the image. On the other hand, the polymer having the acid value of more than 300 mgKOH/g can be less adsorbable to the pigment particle surface to cause penetration of the desorbed polymer into the recording medium to result in decrease of the polymer on the surface of the recorded image to decrease the glossiness. The polymer has a weight-average molecular weight preferably in the range from 1,000 or more to 30,000 or less, more preferably from 3,000 or more to 15,000 or less.

The content of the pigment in the ink is preferably in the range of 0.30 times or more to 10.0 times or less the polymer content by the mass. That is, (pigment content)/(polymer content)=0.30 or more to 10.0 or less (by mass ratio). Herein, the contents of the polymer and the pigment are based on the total mass of the ink. Within the above mass ratio ranging from 0.30 or more to 10.0 or less, the dispersion state of the pigment can be kept stable. At the above mass ratio less than 0.30, the amount of the polymer is excessive relative to the amount of the pigment, which tends to cause insufficiency in the chroma and glossiness of the recorded image. On the other hand, at the above mass ratio more than 10.0, the amount of the polymer is insufficient relative to the amount of the pigment, which tends to make the dispersion nonuniform in the production of the pigment dispersion to make difficult the production of the pigment dispersion and make insufficient the ink storage stability. In the present invention, the mass ratio is particularly preferably 2.0 or more to improve remarkably the glossiness of the recorded image.

(Aqueous Medium and Other Components)

The ink of the present invention contains preferably an aqueous medium constituted of a mixed solvent of water and a water-soluble organic solvent. The water is preferably a deionized water like ion-exchanged water or pure water. The content (mass %) of the water in the ink is preferably in the range from 50.0 mass % or more to 95 mass % or less with respect to the total mass of the ink.

The content (mass %) of the water-soluble organic solvent in the ink ranges preferably from 3.0 mass % or more to 50.0 mass % or less with respect to the total mass of the ink. This content includes the content of 1,2-alkanediol mentioned later. One or more water-soluble organic solvents are used. The water-soluble organic solvent includes glycol ethers such as diethylene glycol monomethyl (or ethyl)ether, and triethylene glycol monoethyl (or butyl)ether; alkanols of 1-4 carbons such as methanol, ethanol, propanol, isopropanol, n-butanol, sec-butanol, isobutanol, and t-butanol; carboxamides such as N,N-dimethylformamide, and N,N-dimethylacetamide; ketones and ketoalcohols such as acetone, methyl ethyl ketone, and 2-methyl-2-hydroxypentan-4-one; cyclic ethers such as tetrahydrofuran, and dioxane; glycols such as ethylene glycol, diethylene glycol, triethylene glycol, tetraethylene glycol, propylene glycol, and butylene glycol; polyethylene glycols having an average molecular weight ranging from 200 to 2,000, specifically a molecular weight of 200, 400, 600, 1,000, and 2,000; acetylene glycol derivatives;

polyhydric alcohols such as glycerin, 1,3-butanediol, 1,5-pentanediol, 1,6-hexanediol, and 1,2,6-hexane triol; heterocyclic compounds such as 2-pyrrolidone, N-methyl-2-pyrrolidone, 1,3-dimethyl-2-imidazolidinone, and N-methylmorpholine; and sulfur-containing compounds such as thiodiglycol, and dimethylsulfoxide.

The ink may contain, in addition to the above components, a moisture-retaining compound such as urea, a urea derivative, trimethylolpropane and trimethylolethane, which are solid at normal temperature. The content (mass %) of such a compound ranges preferably from 0.1 mass % to 20.0 mass %, more preferably from 3.0 mass % or more to 10.0 mass % or less with respect to the total mass of the ink. Further the ink may contain, in addition to the above components, a miscellaneous additive such as a surfactant, a pH-controller, a rust-preventing agent, an antiseptic agent, an anti-fungus agent, an antioxidant, and a reduction-preventing agent.

In multiple pass recording which is conducted widely for a higher image quality in ink jet recording method, the glossiness of the recorded image is liable to be lower. In the multiple pass recording, an image in a unit region is recorded by scanning with a recording head two or more times repeatedly in the main scanning direction. The image recording method by n times of scanning with a recording head (n is an integer of 1 or more) is called n-pass recording. The unit region mentioned above signifies one picture element corresponding to the resolution, or one band of the area of the image recorded by one scanning with a recording head, and may be set for various regions.

In the multiple pass recording, after the dots formed by preceding recording pass have been fixed, other dots are further formed by subsequent pass of recording. The dots recorded subsequently tend to overlap at least with the dots formed by preceding pass of the recording at the end portion the dots. Therefore in the multiple pass recording, level difference is liable to be caused between the whole dots to lower the smoothness or glossiness of the dots. For the higher glossiness of the recorded image in multiple pass recording, the compatibility of the dots should be taken into consideration between the dots formed in a preceding recording pass and the dots formed in a subsequent recording pass. For example, the level difference between the dots recorded in preceding recording and the dots recorded in subsequent recording can be reduced by giving compatibility between the dots to improve the smoothness and glossiness of the dots.

In the multiple pass recording with the ink containing the solid solution having the above-defined particle distribution also, 1,2-alkanediol and polyoxyethylene alkyl ether are incorporated preferably in the ink for improving the glossiness of the recorded image. The effect of remarkable improvement of glossiness of the recorded image by such compounds is considered as below.

The 1,2-alkanediol is a water-soluble organic solvent serving for lowering the surface tension of a liquid drop quickly on ejection of the ink from a recording head. Therefore, in dot formation by deposition of the ink onto a recording medium, the dot diameter can be made larger quickly before the ink is absorbed by the recording medium to make the dot smooth and to improve the glossiness of the recorded image to some extent. Further, the polyoxyethylene alkyl ether serves as a surfactant serving to lengthen the time somewhat for fixation of the firstly formed dot to the recording medium. Therefore, the polyoxyethylene alkyl ether raises the compatibility between the dots formed before and the dots formed successively to decrease the level difference between the dots. By the above mechanism, the smoothness of the dots is considered to be improved and the level difference between the dots is decreased to improve remarkably the glossiness of the recorded image.

The 1,2-alkanediol effective for the ink in the present invention has preferably 5 to 8 carbon atoms in the molecule, specifically the alkanediol being at least one selected from 1,2-pentanediol, 1,2-hexanediol, 1,2-heptanediol, and 1,2-octanediol. The 1,2-alkanediol having carbon atoms of less than 5 can be less effective for improvement of the glossiness of the recorded image, whereas the 1,2-alkanediol having carbon atoms of more than 8 is slightly soluble in water and may require a cosolvent for dissolution in water. The content (mass %) of the 1,2-alkanediol in the ink ranges preferably from 1.0 mass % or more to 20.0 mass % or less, more preferably from 1.0 mass % or more to 10.0 mass % or less with respect to the total mass of the ink.

The polyoxyethylene alkyl ether is a surfactant having the structure represented by $R-O-(CH_2CH_2O)_n-H$, wherein R is an alkyl, and n is an integer. The group R (alkyl group) as the hydrophobic group has carbon atoms for achieving the surfactant property, preferably of 12 to 22 carbons, specifically including the groups of lauryl (12), cetyl (16), stearyl (18), oleyl (18), behenyl (22), (the numerals in the parentheses denoting the carbon numbers of the alkyls). The symbol n of the hydrophilic group in the formula, namely the number of the ethylene oxide group ranges preferably from 10 or more to 40 or less. The content (mass %) of the polyoxyethylene alkyl ether in the ink ranges preferably from 0.1 mass % or more to 5.0 mass % or less, more preferably from 0.1 or more mass % to 3.0 mass % or less with respect to the total mass of the ink.

In the present invention, polyoxyethylene alkyl ether has an HLB value ranging preferably from 13 or more to 20 or less as determined by the Griffin's method. The HLB value less than 13 lessens the effect of raising the compatibility, being less effective in increasing the glossiness. The upper limit of the HLB value is 20 as described later, and in the present invention also, the preferable upper limit of the HLB value of the polyoxyethylene alkyl ether is not more than 20. The HLB value as determined by the Griffin's method represents a degree of hydrophilic or lipophilic properties and ranges from 0 or more to 20 or less. The lower the HLB value, the higher the lipophilic or hydrophobic properties. The higher the HLB value, on the other hand, the higher the hydrophilicity of the surfactant. More specifically, the HLB value as determined by the Griffin's method is calculated in accordance with the following formula (I) based on the formula weight and the molecular weight of the surfactant.

$$HLB \text{ value as determined by the Griffin's method} = 20 \times \text{(Formula weight of hydrophilic group/Molecular weight of surfactant)} \quad \text{formula (1)}$$

<Ink Jet Recording Method, Ink Cartridge, and Ink Jet Recording Apparatus>

The ink jet recording method records an image on a recording medium by ejection of the ink described above through a recording head of an ink jet system. The ink jet recording apparatus of the present invention is equipped with an ink storage portion for storing the ink, and a recording head for ejection of the ink. The ink mentioned above of the present invention is stored in the ink storage portion. The ink of the present invention is effective in a recording head or an ink jet recording apparatus of Bubble-Jet® type of the ink jet system. A conventional ink jet recording method and a conventional ink jet recording apparatus may be employed, provided that the ink of the present invention is used. In the present invention, the "recording" includes embodiments of recording with the ink of the present invention on a recording medium like a glossy paper or a plain paper, and printing with the ink of the present invention on a non-liquid-absorbent medium like a glass plate, a plastic sheet, or a film.

The ink cartridge of the present invention has an ink storage portion for storing the above-mentioned ink of the present invention. In a construction of the ink cartridge, the ink storage portion is constituted of an ink storing chamber for storing a liquid ink, and may be equipped with a room for storing a negative pressure-generating member for retaining the ink therein by applying a negative pressure if necessary. Otherwise, the ink cartridge may have an ink storage portion constituted of an ink storage portion capable of storing the entire ink by the negative-pressure-generating member without the ink storing room. Further, the ink cartridge may be constituted of an ink storage portion and a recording head.

<Production of Pigment Dispersion Liquid>

The process for producing the pigment dispersion liquid is described for producing the ink of the present invention. The ink containing the specified pigment having the characteristic particle diameter defined in the present invention can be produced readily by use of the pigment dispersion liquid produced by the production process described below.

The pigment dispersion liquid can be produced by a dispersion apparatus, by suitably controlling the dispersion conditions such as the dispersion time, the peripheral speed, the kind of the medium, and the particle diameter. The dispersion apparatus includes roll mills, bead mills, paint shakers, sand mills, agitator mills, Nanomizer®, homogenizers, micro-fluidizers, ultimizers, and ultrasonic dispersing machines.

As the results of the investigation, the inventors of the present invention have found that, for obtaining the ratio of $D_{90}/D_{50}$ in the range defined in the present invention, application of a sufficient shearing force to the dispersed pigment is effective in the step of a preliminary dispersion of the pigment. Specifically, the pigment dispersion liquid is prepared preferably through the first to third steps described below.

(First Step)

An emulsion composition containing a polymer, a neutralizing agent, an organic solvent, and water, and the pigment are mixed to obtain a mixture containing non-volatile component at a content ranging from 30 mass % to 50 mass %, and having a viscosity ranging from 50 mPa·s to 1,000 mPa·s at 25° C.

(Second Step)

A preliminary dispersion liquid is prepared which has a viscosity ranging from 50 mPa·s to 500 mPa·s at 25° C. In this step the mixture obtained in the first step is treated by a media less dispersing machine like a high-pressure homogenizer with a net integrated power in the range from 0.50 kWh/kg to 10.00 kWh/kg of the mixture.

(Third Step)

The preliminary dispersion liquid prepared in the above second Step is treated for dispersion.

EXAMPLES

The present invention is descried below in more detail with reference to Examples and Comparative Examples without limiting the invention within the gist of the present invention. In the descriptions below, the terms "part" and "%" are based on mass, unless otherwise mentioned.

The viscosity is measured by a B-type viscometer (Toki Sangyo Co.) at 25° C. The primary particle diameter D (nm) is an average of the diameters of 100 or more primary particles measured by the method below. The pigment dispersion liquid is diluted with pure water. The diluted dispersion liquid is observed with a Hitachi ultra-high-performance scanning electron microscope SU-70 (Hitachi High Technologies Co.), and the pigment particles of the minimum unit size are image-processed and observed for 100 or more particles. The 50%-cumulative diameter $D_{50}$ (nm) and the 90%-cumulative diameter $D_{90}$ (nm) in the pigment particle diameter distribution is measured by Nano-Track UPA150EX (Nikkiso Co.) under the measurement conditions: solvent, water; solvent refractive index, 1.333; solvent viscosity, 1.002 (20° C.) and 0.7971 (30° C.); particle transmissivity, transmissive; particle refractive index, 1.51; particle shape, nonspherical.

<Preparation of Pigment Dispersion Liquid>

(Pigment Dispersion Liquid 1)

As the pigment, Pigment A having a primary particle diameter D of 65 nm was prepared by grinding 5 parts (solid matter) of press cake of C.I. Pigment Red 202 and 5 parts (solid matter) of press cake of C.I. Pigment Violet 19 and treating with an organic solvent for the pigment use in a conventional manner. As the polymer (dispersant), Polymer A was prepared by synthesis from 50 parts of styrene, 39 parts of n-butyl acrylate, and 30 parts of methacrylic acid in a conventional manner. The resulting polymer had an acid value of 195 mgKOH/g, and was a random polymer having a weight-average molecular weight of 9,000. The polymer was neutralized with an equivalent amount of an aqueous potassium hydroxide solution to obtain Polymer A. Pigment Dispersion Liquid 1 was obtained by use of the above Pigment A and Polymer A through the first to third steps below. Incidentally, First to Third Steps mentioned later in the production of other pigment dispersion liquids refer to the above first to third steps. The production conditions and the properties of the resulting pigment dispersion liquid shown in Table 1.

(First Step)

180 parts of Pigment A, 90 parts of Polymer A, and 330 parts of deionized water were mixed by a Homomixer (manufactured by Primix Co.) to obtain a slurry (mixture) having a viscosity of 200 mPa·s.

(Second Step)

The slurry obtained in the above First Step was stirred by a circulation type of homogenizer (Clearmix (M. Tech Co.): referred to as CLM in Tables) for one hour to obtain a preliminary dispersion liquid. The net integral power applied to the slurry was 0.75 kWh/kg. The viscosity of the resulting preliminary dispersion liquid was 1.00 mPa·s (Third Step)

The preliminary dispersion liquid obtained in the above Second Step was dispersed by a circulation type of bead mill (referred to simply as BM in Tables) under the conditions of the packing ratio of 85% of zirconia beads of 0.1 mm-diameter, and a peripheral velocity of 8 m/s for 115 minutes to obtain Pigment Dispersion Liquid 1. The bead mill employed was MiniCer (Ashizawa Fine Tech Co.). The resulting Pigment Dispersion Liquid 1 contained the pigment of D of 65 nm, $D_{50}$ of 103 nm, $D_{90}$ of 186 nm, and $D_{90}/D_{50}$ of 1.8 at a content of 30.0%, and the polymer at a content of 15.0%.

(Pigment Dispersion Liquid 2)

Pigment Dispersion Liquid 2 was prepared in the same manner as Pigment Dispersion Liquid 1 except that, in Third Step, the diameter of the zirconia beads was changed to 0.2 mm, and the dispersion time was changed to 100 minutes. The resulting Pigment Dispersion Liquid 2 contained the pigment of D of 65 nm, $D_{50}$ of 130 nm, $D_{90}$ of 195 nm, and $D_{90}/D_{50}$ of 1.5 at a content of 30.0%, and the polymer at a content of 15.0%.

(Pigment Dispersion Liquid 3)

Pigment Dispersion Liquid 3 was prepared in the same manner as Pigment Dispersion Liquid 1 except that, in Third Step, the diameter of the zirconia beads was changed to 0.1 mm, and the dispersion time was changed to 110 minutes. The resulting Pigment Dispersion Liquid 3 contained the pigment of D of 65 nm, $D_{50}$ of 104 nm, $D_{90}$ of 218 nm, and $D_{90}/D_{50}$ of 2.1 at a content of 30.0%, and the polymer at a content of 15.0%.

(Pigment Dispersion Liquid 4)

Pigment Dispersion Liquid 4 was prepared in the same manner as Pigment Dispersion Liquid 1 except that, in Second Step, the net integrated power applied to the slurry was changed to 1.50 kWh/kg, and in Third Step, the diameter of the zirconia beads was changed to 0.05 mm, and the dispersion time was changed to 130 minutes. The resulting Pigment Dispersion Liquid 4 contained the pigment of D of 65 nm, $D_{50}$ of 73 nm, $D_{90}$ of 111 nm, and $D_{90}/D_{50}$ of 1.5 pigment at a content of 30.0%, and the polymer at a content of 15.0%.

(Pigment Dispersion Liquid 5)

Pigment Dispersion Liquid 5 was prepared in the same manner as Pigment Dispersion Liquid 1 except that, in Second Step, the net integrated power applied to the slurry was changed to 0.50 kWh/kg, and in Third Step, the diameter of the zirconia beads was changed to 0.2 mm, and the type of the bead mill was changed to a multiple path type. The resulting Pigment Dispersion Liquid 5 contained the pigment of D of 65 nm, $D_{50}$ of 130 nm, $D_{90}$ of 286 nm, and $D_{90}/D_{50}$ of 2.2 at a content of 30.0%, and the polymer at a content of 15.0%.

(Pigment Dispersion Liquid 6)

Pigment Dispersion Liquid 6 was prepared in the same manner as Pigment Dispersion Liquid 1 except that Pigment A in First Step of the production of Pigment dispersion Liquid 1 was replaced by Pigment B (solid solution) prepared as mentioned below having a primary particle diameter D of 30 nm, and the dispersion time in Third Step of the production of Pigment Dispersion Liquid 1 was changed to 90 minutes. The above Pigment B was obtained by grinding 5 parts (solid matter) of a press cake of C.I. Pigment Red 202 and 5 parts (solid matter) of a press cake of C.I. Pigment Violet 19 and treating the mixture with an organic solvent in a conventional manner for pigment use. The resulting Pigment Dispersion Liquid 6 contained the pigment of D of 30 nm, $D_{50}$ of 100 nm, $D_{90}$ of 202 nm, and $D_{90}/D_{50}$ of 2.0 at a content of 30.0%, and the polymer at a content of 15.0%.

(Pigment Dispersion Liquid 7)

Pigment Dispersion Liquid 7 was prepared in the same manner as Pigment Dispersion Liquid 1 except that Pigment A in First Step was replaced by Pigment C (solid solution) prepared as mentioned below having a primary particle diameter D of 48 nm and the dispersion time in Third Step of the production of Pigment Dispersion Liquid 1 was changed to 115 minutes. The above Pigment C was obtained by grinding 5 parts (solid matter) of a press cake of C.I. Pigment Red 202 and 5 parts (solid matter) of a press cake of C.I. Pigment Violet 19 and treating the mixture with an organic solvent in a conventional manner for pigment use. The resulting Pigment Dispersion Liquid 7 contained the pigment of D of 48 nm, $D_{50}$ of 73 nm, $D_{90}$ of 148 nm, and $D_{90}/D_{50}$ of 2.0 at a content of 30.0%, and the polymer at a content of 15.0%.

(Pigment Dispersion Liquid 8)

Pigment Dispersion Liquid 8 was prepared in the same manner as Pigment Dispersion Liquid 1 except that Pigment A in First Step was replaced by Pigment D (solid solution) prepared as mentioned below having a primary particle diameter D of 50 nm and the dispersion time in Third Step was changed to 110 minutes. The above Pigment D was obtained by grinding 5 parts (solid matter) of a press cake of C.I. Pigment Red 202 and 5 parts (solid matter) of a press cake of C.I. Pigment Violet 19 and treating the mixture with an organic solvent in a conventional manner for pigment use. The resulting Pigment Dispersion Liquid 8 contained the pigment of D of 50 nm, $D_{50}$ of 74 nm, $D_{90}$ of 145 nm, and $D_{90}/D_{50}$ of 2.0 at a content of 30.0%, and the polymer at a content of 15.0%.

(Pigment Dispersion Liquid 9)

Pigment Dispersion Liquid 9 was prepared in the same manner as Pigment Dispersion Liquid 1 except that Pigment A in First Step was replaced by Pigment E (solid solution) prepared as mentioned below having a primary particle diameter D of 120 nm and the dispersion time in Third Step was changed to 175 minutes. The above Pigment E was obtained by grinding 5 parts (solid matter) of a press cake of C.I. Pigment Red 202 and 5 parts (solid matter) of a press cake of C.I. Pigment Violet 19 and treating the mixture with an organic solvent in a conventional manner for pigment use. The resulting Pigment Dispersion Liquid 9 contained the pigment of D of 120 nm, $D_{50}$ of 128 nm, $D_{90}$ of 243 nm, and $D_{90}/D_{50}$ of 1.9 at a content of 30.0%, and the polymer at a content of 15.0%.

(Pigment Dispersion Liquid 10)

Pigment Dispersion Liquid 10 was prepared in the same manner as Pigment Dispersion Liquid 1 except that Pigment A in First Step was replaced by Pigment F (solid solution) prepared as mentioned below having a primary particle diameter D of 123 nm and the dispersion time in Third Step was changed to 185 minutes. The above Pigment F was obtained by grinding 5 parts (solid matter) of a press cake of C.I. Pigment Red 202 and 5 parts (solid matter) of a press cake of C.I. Pigment Violet 19 and treating the mixture with an organic solvent in a conventional manner for pigment use. The resulting Pigment Dispersion Liquid 10 contained the pigment of D of 123 nm, $D_{50}$ of 128 nm, $D_{90}$ of 248 nm, and $D_{90}/D_{50}$ of 1.9 at a content of 30.0%, and the polymer at a content of 15.0%.

(Pigment Dispersion Liquid 11)

Pigment Dispersion Liquid 11 was prepared in the same manner as Pigment Dispersion Liquid 1 except that Polymer A in First Step was replaced by Polymer B mentioned below, and the dispersion time in Third Step was changed to 100 minutes. This Polymer B was prepared by polymerizing 40 parts of styrene, 53.9 parts of n-butyl acrylate and 6 parts of methacrylic acid in a conventional manner to obtain a random copolymer having an acid value of 40 mgKOH/g and a weight-average molecular weight of 8,800, and neutralizing this polymer with an equivalent amount of an aqueous potassium hydroxide solution. The resulting Pigment Dispersion Liquid 11 contained the pigment of D of 65 nm, $D_{50}$ of 103 nm, $D_{90}$ of 217 nm, and $D_{90}/D_{50}$ of 2.1 at a content of 30.0%, and the polymer at a content of 15.0%.

(Pigment Dispersion Liquid 12)

Pigment Dispersion Liquid 12 was prepared in the same manner as Pigment Dispersion Liquid 1 except that Polymer A in First Step was replaced by Polymer C mentioned below, and the dispersion time in Third Step was changed to 100 minutes. This Polymer C was prepared by polymerizing 40 parts of styrene, 7 parts of n-butyl acrylate and 53 parts of methacrylic acid in a conventional manner to obtain a random copolymer having an acid value of 350 mgKOH/g and a weight-average molecular weight of 9,100, and neutralizing this polymer with an equivalent amount of an aqueous potassium hydroxide solution. The resulting Pigment Dispersion Liquid 12 contained the pigment of D of 65 nm, $D_{50}$ of 102 nm, $D_{90}$ of 224 nm, and $D_{90}/D_{50}$ of 2.2 at a content of 30.0%, and the polymer at a content of 15.0%.

(Pigment Dispersion Liquid 13)

Pigment Dispersion Liquid 13 was prepared in the same manner as Pigment Dispersion Liquid 1 except that Polymer A in First Step was replaced by Polymer D mentioned below, and the dispersion time in Third Step was changed to 100 minutes. This Polymer D was prepared by polymerizing 40 parts of styrene, 52 parts of n-butyl acrylate and 8 parts of methacrylic acid in a conventional manner to obtain a random copolymer having an acid value of 50 mgKOH/g and a weight-average molecular weight of 8,800, and neutralizing this polymer with an equivalent amount of an aqueous potassium hydroxide solution. The resulting Pigment Dispersion Liquid 13 contained the pigment of D of 65 nm, $D_{50}$ of 101 nm, $D_{90}$ of 212 nm, and $D_{90}/D_{50}$ of 2.1 at a content of 30.0%, and the polymer at a content of 15.0%.

(Pigment Dispersion Liquid 14)

Pigment Dispersion Liquid 14 was prepared in the same manner as Pigment Dispersion Liquid 1 except that Polymer A in First Step was replaced by Polymer E mentioned below, and the dispersion time in Third Step was changed to 90 minutes. This Polymer E was prepared by polymerizing 40 parts of styrene, 14 parts of n-butyl acrylate and 46 parts of methacrylic acid in a conventional manner to obtain a random copolymer having an acid value of 300 mgKOH/g and a weight-average molecular weight of 9,100, and neutralizing this polymer with an equivalent amount of an aqueous potassium hydroxide solution. The resulting Pigment Dispersion Liquid 14 contained the pigment of D of 65 nm, $D_{50}$ of 103 nm, $D_{90}$ of 227 nm, and $D_{90}/D_{50}$ of 2.2 at a content of 30.0%, and the polymer at a content of 15.0%.

(Pigment Dispersion Liquid 15)

Pigment Dispersion Liquid 15 was prepared in the same manner as Pigment Dispersion Liquid 1 except that Polymer A in First Step was replaced by Polymer F mentioned below, and the dispersion time in Third Step was changed to 90 minutes. This Polymer F was prepared by polymerizing 40 parts of styrene, 15 parts of n-butyl acrylate, 25 parts of methacrylic acid, and 20 parts of polyethylene glycol monomethacrylate in a conventional manner to obtain a random copolymer having an acid value of 160 mgKOH/g and a weight-average molecular weight of 8,600, and neutralizing this polymer with an equivalent amount of an aqueous potassium hydroxide solution. The resulting Pigment Dispersion Liquid 15 contained the pigment of D of 65 nm, $D_{50}$ of 105 nm, $D_{90}$ of 200 nm, and $D_{90}/D_{50}$ of 1.9 at a content of 30.0%, and the polymer at a content of 15.0%.

(Pigment Dispersion Liquid 16)

Pigment Dispersion Liquid 16 was prepared in the same manner as Pigment Dispersion Liquid 1 except that, in First Step, a slurry having a viscosity of 250 mPa·s was prepared by use of 315 parts of Polymer A, 90 parts of Pigment A, and 195 parts of ion-exchanged water, and in Second Step, from the slurry a preliminary dispersion liquid having a viscosity of 150 mPa·s was prepared. The resulting Pigment Dispersion Liquid 16 contained the pigment of D of 65 nm, $D_{50}$ of 101 nm, $D_{90}$ of 181 nm, and $D_{90}/D_{50}$ of 1.8 at a content of 15.0%, and the polymer at a content of 52.5%.

(Pigment Dispersion Liquid 17)

Pigment Dispersion Liquid 17 was prepared in the same manner as Pigment Dispersion Liquid 1 except that, in First Step, a slurry having a viscosity of 180 mPa·s was prepared by use of 18 parts of Polymer A, 180 parts of Pigment A, and 402 parts of ion-exchanged water. The resulting Pigment Dispersion Liquid 17 contained the pigment of D of 65 nm, $D_{50}$ of 104 nm, $D_{90}$ of 208 nm, and $D_{90}/D_{50}$ of 2.0 at a content of 30.0%, and the polymer at a content of 3.0%.

(Pigment Dispersion Liquid 18)

Pigment Dispersion Liquid 18 was prepared in the same manner as Pigment Dispersion Liquid 1 except that, in First Step, a slurry having a viscosity of 180 mPa·s was prepared by use of 17.4 parts of Polymer A, 180 parts of Pigment A, and 402.6 parts of ion-exchanged water. The resulting Pigment Dispersion Liquid 18 contained the pigment of D of 65 nm, $D_{50}$ of 106 nm, $D_{90}$ of 212 nm, and $D_{90}/D_{50}$ of 2.0 at a content of 30.0%, and the polymer at a content of 2.9%.

(Pigment Dispersion Liquid 19)

Pigment Dispersion Liquid 19 was prepared in the same manner as Pigment Dispersion Liquid 1 except that, in First Step, a slurry having a viscosity of 250 mPa·s was prepared by use of 270 parts of Polymer A, 90 parts of Pigment A, and 240 parts of ion-exchanged water, and in Second Step, from the slurry a preliminary dispersion liquid having a viscosity of 150 mPa·s was prepared. The resulting Pigment Dispersion Liquid 19 contained the pigment of D of 65 nm, $D_{50}$ of 103 nm, $D_{90}$ of 186 nm, and $D_{90}/D_{50}$ of 1.8 at a content of 15.0%, and the polymer at a content of 45.0%.

(Pigment Dispersion Liquid 20)

The pigment modified as described below was used. Pigment A which had been modified by 4-aminobenzoic acid was further modified by bonding thereto a copolymer of styrene/n-butyl-acrylate/methacrylic-acid synthesized in a conventional method and having an aminophenyl group as an end group. More specifically, 200 parts of Pigment A modified by 4-aminobenzoic acid and 1,000 parts of an aqueous 5% solution of the above bonding polymer were kept at 55° C. in a reactor and stirred at a rotation speed of 300 rpm for 20 minutes. Then 30 parts of 25% sodium nitrite solution was added dropwise thereto in 15 minutes, and thereto 100 parts of ion-exchanged water was added. The mixture was further allowed to react at 60° C. for 2 hours. The pH of the reaction mixture was adjusted to 10 to 11 by addition of an aqueous 1.0N potassium hydroxide solution with stirring. Therefrom modified Pigment A having two kinds of atomic groups bonded chemically thereto was obtained by desalting, purification, and coarse particle removal of the above reaction mixture. Pigment dispersion Liquid 20 was obtained in the same manner as Pigment Dispersion Liquid 1 except that the modified Pigment A was used without using the polymer under the conditions shown in Table 1. In Table 1, the mixed amount in Pigment Dispersion Liquid 20 denotes the amount of the polymer bonded to 100 parts of the pigment. The resulting Pigment Dispersion Liquid 20 contained the pigment of D of 65 nm, $D_{50}$ of 103 nm, $D_{90}$ of 185 nm, and $D_{90}/D_{50}$ of 1.8 at a content of 10.0%.

(Pigment Dispersion Liquid 21)

Pigment Dispersion Liquid 21 was prepared in the same manner as Pigment Dispersion Liquid 1 except that Pigment A in First Step was replaced by Pigment G (solid solution) prepared as mentioned below having a primary particle diameter D of 20 nm and the dispersion time in Third Step was changed to 200 minutes. The above Pigment G was obtained by grinding 5 parts (solid matter) of a press cake of C.I. Pigment Red 202 and 5 parts (solid matter) of a press cake of C.I. Pigment Violet 19 and treating the mixture with an organic solvent in a conventional manner for pigment use. The resulting Pigment Dispersion Liquid 21 contained the pigment of D of 20 nm, $D_{50}$ of 22 nm, $D_{90}$ of 33 nm, and $D_{90}/D_{50}$ of 1.5, the pigment at a content of 30.0%, and the polymer at a content of 15.0%.

(Pigment Dispersion Liquid 22)

Pigment Dispersion Liquid 22 was prepared in the same manner as Pigment Dispersion Liquid 1 except that, in First Step, a slurry having a viscosity of 20 mPa·s was prepared by use of 30 parts of Polymer A, 60 parts of Pigment A, and 510 parts of ion-exchanged water, and in Second Step, the net integrated power applied to the slurry was changed to 0.30 kWh/kg to obtain a preliminary dispersion liquid having a viscosity of 10 mPa·s, and further in Third Step, the zirconia beads diameter was changed to 0.2 mm and a multiple path type bead mill was employed. The resulting Pigment Dispersion Liquid 22 contained the pigment of D of 65 nm, $D_{50}$ of 140 nm, $D_{90}$ of 236 nm, and $D_{90}/D_{50}$ of 1.7 at a content of 10.0%, and the polymer at a content of 5.0%.

(Pigment Dispersion Liquid 23)

Pigment Dispersion Liquid 23 was prepared in the same manner as Pigment Dispersion Liquid 18 except that, in Third Step, the diameter of the zirconia beads was changed to 0.1 mm. The resulting Pigment Dispersion Liquid 23 contained the pigment of D of 65 nm, $D_{50}$ of 87 nm, $D_{90}$ of 244 nm, and $D_{90}/D_{50}$ of 2.8 at a content of 10.0%, and the polymer at a content of 5.0%.

(Pigment Dispersion Liquid 24)

Pigment Dispersion Liquid 24 was prepared in the same manner as Pigment Dispersion Liquid 18 except that, in Third Step, the diameter of the zirconia beads was changed to 0.05 mm. The resulting Pigment Dispersion Liquid 24 contained the pigment of D of 65 nm, $D_{50}$ of 60 nm, $D_{90}$ of 122 nm, and $D_{90}/D_{50}$ of 2.0 at a content of 10.0%, and the polymer at a content of 5.0%.

(Pigment Dispersion Liquid 25)

Pigment Dispersion Liquid 25 was prepared in the same manner as Pigment Dispersion Liquid 5 except that, in First Step, the dispersion time was changed to 100 minutes. The resulting Pigment Dispersion Liquid 25 contained the pigment of D of 65 nm, $D_{50}$ of 130 nm, $D_{90}$ of 300 nm, and $D_{90}/D_{50}$ of 2.3 at a content of 30.0%, and the polymer at a content of 15.0%.

(Pigment Dispersion Liquid 26)

Pigment Dispersion Liquid 26 was prepared in the same manner as Pigment Dispersion Liquid 1 except that Pigment H(C.I. Pigment Red 202: CINQUASIA MAGENTA RT-235-D; Ciba Co.) was used in place of Pigment A. The resulting Pigment Dispersion Liquid 26 contained the pigment of D of 72 nm, $D_{50}$ of 105 nm, $D_{90}$ of 190 nm, and $D_{90}/D_{50}$ of 1.8 at a content of 30.0%, and the polymer at a content of 15.0%.

(Pigment Dispersion Liquid 27)

Pigment Dispersion Liquid 27 was prepared in the same manner as Pigment Dispersion Liquid 1 except that Pigment I (C.I. Pigment Violet 19: CINQUASIA RED B NRT-796-D; Ciba Co.) was used in place of Pigment A, and in Third Step, the dispersion time was changed to 160 minutes. The resulting Pigment Dispersion Liquid 27 contained the pigment of D of 119 nm, $D_{50}$ of 125 nm, $D_{90}$ of 238 nm, and $D_{90}/D_{50}$ of 1.9 at a content of 30.0%, and the polymer at a content of 15.0%.

(Pigment Dispersion Liquid 28)

Pigment Dispersion Liquid 28 was prepared by use of Pigment A according to the method described in Japanese Patent Application Laid-Open No. 2003-128955 on preparation of the pigment dispersion liquid 11 in the example therein. The resulting Pigment Dispersion Liquid 28 contained the pigment of D of 20 nm, $D_{50}$ of 20 nm, $D_{90}$ of 30 nm, and $D_{90}/D_{50}$ of 1.5 at a content of 6.0%.

(Pigment Dispersion Liquid 29)

Pigment Dispersion Liquid 29 was prepared in the same manner as Pigment Dispersion Liquid 15 except that Pigment J (CROMOPHTAL JET MAGENTA 2BC, a solid mixture of C.I. Pigment Red 202 and C.I. Pigment Violet 19; Ciba Co.) was used in place of Pigment A, and Third Step was not conducted. The resulting Pigment Dispersion Liquid 29 contained the pigment of D of 110 nm, $D_{50}$ of 300 nm, $D_{90}$ of 1,000 nm, and $D_{90}/D_{50}$ of 3.3 at a content of 30.0%, and the polymer at a content of 15.0%.

Pigments A-G, which are respectively a solid solution, used in First Step are different in the primary particle diameter (nm). However, the formation of the solid solutions in the preparation processes was confirmed by powder X-ray diffraction. Specifically, the formation of the solid solution was confirmed from Bragg angles) ($2\theta+0.2°$ at 5.9°, 11.9°, 13.6°, 14.8°, 24.6°, and 27.5° in X-ray diffraction pattern. The FIGURE shows powder X-ray diffraction patterns of the solid solutions (Pigments A-G). For the measurement, powder X-ray diffractometer D8 DISCOVER (Bruker Co.) was employed.

Table 1 shows collectively the constitutions of the pigment dispersion liquids and the processes of the production thereof. Incidentally some of the water-soluble organic solvents and components of the additives in the ink can change the particle diameter of the dispersed pigment, but actually the change is negligible. Therefore, the dimensions of D, $D_{50}$, and $D_{90}$ of the pigment particles in ink were the same as those in the pigment dispersion liquid.

TABLE 1

Preparation Conditions of Pigment Dispersion Liquid

| | | Pigment Dispersion Liquid | | | | | | | | | |
|---|---|---|---|---|---|---|---|---|---|---|---|
| | | 1 | 2 | 3 | 4 | 5 | 6 | 7 | 8 | 9 | 10 |
| Pigment | Kind of Pigment | A | A | A | A | A | B | C | D | E | F |
| Polymer | Kind of Polymer | A | A | A | A | A | A | A | A | A | A |
| | Acid Value [mgKOH/g] | 195 | 195 | 195 | 195 | 195 | 195 | 195 | 195 | 195 | 195 |
| | Wt-av. Molecular Weight | 9,000 | 9,000 | 9,000 | 9,000 | 9,000 | 9,000 | 9,000 | 9,000 | 9,000 | 9,000 |
| | Mixed Amount (*1) | 50 | 50 | 50 | 50 | 50 | 50 | 50 | 50 | 50 | 50 |
| Dispersion Conditions | Viscosity in Step 1 [mPa·s] | 200 | 200 | 200 | 200 | 200 | 200 | 200 | 200 | 200 | 200 |
| | Dispersion Apparatus in Step 2 | CLM | CLM | CLM | CLM | CLM | CLM | CLM | CLM | CLM | CLM |
| | Viscosity in Step 2 [mPa·s] | 100 | 100 | 100 | 100 | 100 | 100 | 100 | 100 | 100 | 100 |
| | Integrated Power in Step 2 [kWh/kg] | 0.75 | 0.75 | 0.75 | 1.50 | 0.50 | 0.75 | 0.75 | 0.75 | 0.75 | 0.75 |
| | Operation Mode in Step 2 | circultn | circltn | circltn | circltn | circltn | circltn | circltn | circltn | circltn | circltn |
| | Dispersion Appartus in Step 3 | BM | BM | BM | BM | BM | BM | BM | BM | BM | BM |

TABLE 1-continued

| | | | | | | | | | | |
|---|---|---|---|---|---|---|---|---|---|---|
| | Operation Mode in Step 3 | circltn | circltn | circltn | circultn | multi-path | circltn | circltn | circltn | circltn | circltn |
| | Medium Diameter in Step 3 [mm] | 0.1 | 0.2 | 0.1 | 0.05 | 0.2 | 0.1 | 0.1 | 0.1 | 0.1 | 0.1 |
| Properties of Pigment | Primary Particle Diameter D [nm] | 65 | 65 | 65 | 65 | 65 | 30 | 48 | 50 | 120 | 123 |
| | $D_{50}$ [nm] | 103 | 130 | 104 | 73 | 130 | 100 | 73 | 74 | 128 | 128 |
| | $D_{90}$ [nm] | 186 | 195 | 218 | 111 | 286 | 202 | 148 | 145 | 243 | 248 |
| | $D_{90}/D_{50}$ | 1.8 | 1.5 | 2.1 | 1.5 | 2.2 | 2.0 | 2.0 | 2.0 | 1.9 | 1.9 |

| | | Pigment Dispersion Liquid | | | | | | | | | |
|---|---|---|---|---|---|---|---|---|---|---|---|
| | | 11 | 12 | 13 | 14 | 15 | 16 | 17 | 18 | 19 | 20 |
| Pigment | Kind of Pigment | A | A | A | A | A | A | A | A | A | Modified A |
| Polymer | Kind of Polymer | B | C | D | E | F | A | A | A | A | Polymer-bonded |
| | Acid Value [mgKOH/g] | 40 | 350 | 50 | 300 | 160 | 195 | 195 | 195 | 195 | — |
| | Wt-av. Molecular Weight | 8,800 | 9,100 | 8,800 | 9,100 | 8,600 | 9,000 | 9,000 | 9,000 | 9,000 | — |
| | Mixed Amount (*1) | 50 | 50 | 50 | 50 | 50 | 350 | 10 | 9.7 | 300 | 25 |
| Dispersion Conditions | Viscosity in Step 1 [mPa·s] | 200 | 200 | 200 | 200 | 200 | 250 | 180 | 180 | 250 | 100 |
| | Dispersion Apparatus in Step 2 | CLM | CLM | CLM | CLM | CLM | CLM | CLM | CLM | CLM | CLM |
| | Viscosity in Step 2 [mPa·s] | 100 | 100 | 100 | 100 | 100 | 150 | 100 | 100 | 150 | 80 |
| | Integrated Power in Step 2 [kWh/kg] | 0.75 | 0.75 | 0.75 | 0.75 | 0.75 | 0.75 | 0.75 | 0.75 | 0.75 | 0.75 |
| | Operation Mode in Step 2 | circltn | circltn | circltn | circltn | circltn | circltn | circltn | circltn | circltn | circltn |
| | Dispersion Appartus in Step 3 | BM | BM | BM | BM | BM | BM | BM | BM | BM | BM |
| | Operation Mode in Step 3 | circltn | circltn | circltn | circultn | circltn | circltn | circltn | circltn | circltn | circltn |
| | Medium Diameter in Step 3 [mm] | 0.1 | 0.1 | 0.1 | 0.1 | 0.1 | 0.1 | 0.1 | 0.1 | 0.1 | 0.1 |
| Properties of Pigment | Primary Particle Diameter D [nm] | 65 | 65 | 65 | 65 | 65 | 65 | 65 | 65 | 65 | 65 |
| | $D_{50}$ [nm] | 103 | 102 | 101 | 103 | 105 | 101 | 104 | 106 | 103 | 103 |
| | $D_{90}$ [nm] | 217 | 224 | 212 | 227 | 200 | 181 | 208 | 212 | 186 | 185 |
| | $D_{90}/D_{50}$ | 2.1 | 2.2 | 2.1 | 2.2 | 1.9 | 1.8 | 2.0 | 2.0 | 1.8 | 1.8 |

| | | Pigment Dispersion Liquid | | | | | | | | |
|---|---|---|---|---|---|---|---|---|---|---|
| | | 21 | 22 | 23 | 24 | 25 | 26 | 27 | 28 | 29 |
| Pigment | Kind of Pigment | G | A | A | A | A | H | I | A | J |
| Polymer | Kind of Polymer | A | A | A | A | A | A | A | — | F |
| | Acid Value [mgKOH/g] | 195 | 195 | 195 | 195 | 195 | 195 | 195 | — | 160 |
| | Wt-av. Molecular Weight | 9,000 | 9,000 | 9,000 | 9,000 | 9,000 | 9,000 | 9,000 | — | 8,600 |
| | Mixed Amount (*1) | 50 | 50 | 50 | 50 | 50 | 50 | 50 | — | 50 |
| Dispersion Conditions | Viscosity in Step 1 [mPa·s] | 200 | 20 | 20 | 20 | 200 | 200 | 200 | — | 200 |
| | Dispersion Apparatus in Step 2 | CLM | CLM | CLM | CLM | CLM | CLM | CLM | — | CLM |
| | Viscosity in Step 2 [mPa·s] | 100 | 10 | 10 | 10 | 100 | 100 | 100 | — | 100 |
| | Integrated Power in Step 2 [kWh/kg] | 0.75 | 0.30 | 0.30 | 0.30 | 0.50 | 0.75 | 0.75 | — | 0.75 |
| | Operation Mode in Step 2 | circltn | circltn | circltn | circltn | circltn | circltn | circltn | — | circltn |
| | Dispersion Appartus in Step 3 | BM | BM | BM | BM | BM | BM | BM | — | — |
| | Operation Mode in Step 3 | circltn | multi-path | multi-path | multi-path | multi-path | circltn | circltn | — | — |
| | Medium Diameter in Step 3 [mm] | 0.1 | 0.2 | 0.1 | 0.05 | 0.2 | 0.1 | 0.1 | — | — |
| Properties of Pigment | Primary Particle Diameter D [nm] | 20 | 65 | 65 | 65 | 65 | 72 | 119 | 20 | 110 |
| | $D_{50}$ [nm] | 22 | 140 | 87 | 60 | 130 | 105 | 125 | 20 | 300 |
| | $D_{90}$ [nm] | 33 | 236 | 244 | 122 | 300 | 190 | 238 | 30 | 1000 |
| | $D_{90}/D_{50}$ | 1.5 | 1.7 | 2.8 | 2.0 | 2.3 | 1.8 | 1.9 | 1.5 | 3.3 |

(*1) Parts of the polymer per 100 parts of the pigment
circltn: circulation

<Preparation of Ink>

The ink was prepared by mixing sufficiently the pigment dispersion liquid and the components shown in Table 2, and pressure-filtering the mixture through a micro-filter (Fuji Film Co.) having a pore size of 1.0 μm.

TABLE 2

Composition of Ink (Unit of upper columns: %)

| | Examples | | | | | | | | | | |
|---|---|---|---|---|---|---|---|---|---|---|---|
| | 1 | 2 | 3 | 4 | 5 | 6 | 7 | 8 | 9 | 10 | 11 |
| Pigment Dispersion Liquid 1 | 6.7 | | | | | | | | | | |
| Pigment Dispersion Liquid 2 | | 6.7 | | | | | | | | | |
| Pigment Dispersion Liquid 3 | | | 6.7 | | | | | | | | |
| Pigment Dispersion Liquid 4 | | | | 6.7 | | | | | | | |
| Pigment Dispersion Liquid 5 | | | | | 6.7 | | | | | | |
| Pigment Dispersion Liquid 6 | | | | | | 6.7 | | | | | |
| Pigment Dispersion Liquid 7 | | | | | | | 6.7 | | | | |
| Pigment Dispersion Liquid 8 | | | | | | | | 6.7 | | | |
| Pigment Dispersion Liquid 9 | | | | | | | | | 6.7 | | |
| Pigment Dispersion Liquid 10 | | | | | | | | | | 6.7 | |
| Pigment Dispersion Liquid 11 | | | | | | | | | | | 6.7 |
| Pigment dispersion Liquid 12 | | | | | | | | | | | |
| Pigment Dispersion Liquid 13 | | | | | | | | | | | |
| Pigment Dispersion Liquid 14 | | | | | | | | | | | |
| Pigment Dispersion Liquid 15 | | | | | | | | | | | |
| Pigment Dispersion Liquid 16 | | | | | | | | | | | |
| Pigment Dispersion Liquid 17 | | | | | | | | | | | |
| Pigment Dispersion Liquid 18 | | | | | | | | | | | |
| Pigment Dispersion Liquid 19 | | | | | | | | | | | |
| Pigment Dispersion Liquid 20 | | | | | | | | | | | |
| Pigment Dispersion Liquid 21 | | | | | | | | | | | |
| Pigment Dispersion Liquid 22 | | | | | | | | | | | |
| Pigment Dispersion Liquid 23 | | | | | | | | | | | |
| Pigment Dispersion Liquid 24 | | | | | | | | | | | |
| Pigment Dispersion Liquid 25 | | | | | | | | | | | |
| Pigment Dispersion Liquid 26 | | | | | | | | | | | |
| Pigment Dispersion Liquid 27 | | | | | | | | | | | |
| Pigment Dispersion Liquid 28 | | | | | | | | | | | |
| Pigment dispersion Liquid 29 | | | | | | | | | | | |
| Glycerin | 2.5 | 2.5 | 2.5 | 2.5 | 2.5 | 2.5 | 2.5 | 2.5 | 2.5 | 2.5 | 2.5 |
| 2-Pyrrolidone | 2.5 | 2.5 | 2.5 | 2.5 | 2.5 | 2.5 | 2.5 | 2.5 | 2.5 | 2.5 | 2.5 |
| Polyethylene Glycol (*1) | 4.0 | 4.0 | 4.0 | 4.0 | 4.0 | 4.0 | 4.0 | 4.0 | 4.0 | 4.0 | 4.0 |
| 1,2-Hexanediol | | | | | | | | | | | |
| AcetylenolE100 (*2) | 0.5 | 0.5 | 0.5 | 0.5 | 0.5 | 0.5 | 0.5 | 0.5 | 0.5 | 0.5 | 0.5 |
| EMALEX 712 (*3) | | | | | | | | | | | |
| Ion-exchanged water | 83.8 | 83.8 | 83.8 | 83.8 | 83.8 | 83.8 | 83.8 | 83.8 | 83.8 | 83.8 | 83.8 |
| Pigment Content [%] | 2.0 | 2.0 | 2.0 | 2.0 | 2.0 | 2.0 | 2.0 | 2.0 | 2.0 | 2.0 | 2.0 |
| Polymer Content [%] | 1.00 | 1.00 | 1.00 | 1.00 | 1.00 | 1.00 | 1.00 | 1.00 | 1.00 | 1.00 | 1.00 |
| Pigment/Polymer Ratio (*4) | 2.0 | 2.0 | 2.0 | 2.0 | 2.0 | 2.0 | 2.0 | 2.0 | 2.0 | 2.0 | 2.0 |

| | Examples | | | | | | | | | | |
|---|---|---|---|---|---|---|---|---|---|---|---|
| | 12 | 13 | 14 | 15 | 16 | 17 | 18 | 19 | 20 | 21 | 22 |
| Pigment Dispersion Liquid 1 | | | | | | | | | | | |
| Pigment Dispersion Liquid 2 | | | | | | | | | | | |
| Pigment Dispersion Liquid 3 | | | | | | | | | | | |
| Pigment Dispersion Liquid 4 | | | | | | | | | | | |
| Pigment Dispersion Liquid 5 | | | | | | | | | | | |
| Pigment Dispersion Liquid 6 | | | | | | | | | | | |
| Pigment Dispersion Liquid 7 | | | | | | | | | | | |
| Pigment Dispersion Liquid 8 | | | | | | | | | | | |
| Pigment Dispersion Liquid 9 | | | | | | | | | | | |
| Pigment Dispersion Liquid 10 | | | | | | | | | | | |
| Pigment Dispersion Liquid 11 | | | | | | | | | | | |
| Pigment dispersion Liquid 12 | 6.7 | | | | | | | | | | |
| Pigment Dispersion Liquid 13 | | 6.7 | | | | | | | | | |
| Pigment Dispersion Liquid 14 | | | 6.7 | | | | | | | | |
| Pigment Dispersion Liquid 15 | | | | 6.7 | 6.7 | | | | | | |
| Pigment Dispersion Liquid 16 | | | | | | 13.3 | | | | | |
| Pigment Dispersion Liquid 17 | | | | | | | 6.7 | | | | |
| Pigment Dispersion Liquid 18 | | | | | | | | 6.7 | | | |
| Pigment Dispersion Liquid 19 | | | | | | | | | 13.3 | | |
| Pigment Dispersion Liquid 20 | | | | | | | | | | 20.0 | |
| Pigment Dispersion Liquid 21 | | | | | | | | | | | 6.7 |
| Pigment Dispersion Liquid 22 | | | | | | | | | | | |

TABLE 2-continued

Composition of Ink (Unit of upper columns: %)

| | | | | | | | | | | | |
|---|---|---|---|---|---|---|---|---|---|---|---|
| Pigment Dispersion Liquid 23 | | | | | | | | | | | |
| Pigment Dispersion Liquid 24 | | | | | | | | | | | |
| Pigment Dispersion Liquid 25 | | | | | | | | | | | |
| Pigment Dispersion Liquid 26 | | | | | | | | | | | |
| Pigment Dispersion Liquid 27 | | | | | | | | | | | |
| Pigment Dispersion Liquid 28 | | | | | | | | | | | |
| Pigment dispersion Liquid 29 | | | | | | | | | | | |
| Glycerin | 2.5 | 2.5 | 2.5 | 2.5 | 2.5 | 2.5 | 2.5 | 2.5 | 2.5 | 2.5 | 2.5 |
| 2-Pyrrolidone | 2.5 | 2.5 | 2.5 | 2.5 | 2.5 | 2.5 | 2.5 | 2.5 | 2.5 | 2.5 | 2.5 |
| Polyethylene Glycol (*1) | 4.0 | 4.0 | 4.0 | 4.0 | | 4.0 | 4.0 | 4.0 | 4.0 | 4.0 | 4.0 |
| 1,2-Hexanediol | | | | | 4.0 | | | | | | |
| AcetylenolE100 (*2) | 0.5 | 0.5 | 0.5 | 0.5 | 0.5 | 0.5 | 0.5 | 0.5 | 0.5 | 0.5 | 0.5 |
| EMALEX 712 (*3) | | | | | 0.5 | | | | | | |
| Ion-exchanged water | 83.8 | 83.8 | 83.8 | 83.8 | 83.3 | 77.2 | 83.8 | 83.8 | 77.2 | 70.5 | 83.8 |
| Pigment Content [%] | 2.0 | 2.0 | 2.0 | 2.0 | 2.0 | 2.0 | 2.0 | 2.0 | 2.0 | 2.0 | 2.0 |
| Polymer Content [%] | 1.00 | 1.00 | 1.00 | 1.00 | 1.00 | 7.00 | 0.20 | 0.19 | 6.0 | 0.0 | 1.00 |
| Pigment/Polymer Ratio (*4) | 2.0 | 2.0 | 2.0 | 2.0 | 2.0 | 0.29 | 10.0 | 10.3 | 0.33 | — | 2.0 |

| | Comparative Examples | | | | | | | | |
|---|---|---|---|---|---|---|---|---|---|
| | 1 | 2 | 3 | 4 | 5 | 6 | 7 | 8 | 9 |
| Pigment Dispersion Liquid 1 | | | | | | | | | |
| Pigment Dispersion Liquid 2 | | | | | | | | | |
| Pigment Dispersion Liquid 3 | | | | | | | | | |
| Pigment Dispersion Liquid 4 | | | | | | | | | |
| Pigment Dispersion Liquid 5 | | | | | | | | | |
| Pigment Dispersion Liquid 6 | | | | | | | | | |
| Pigment Dispersion Liquid 7 | | | | | | | | | |
| Pigment Dispersion Liquid 8 | | | | | | | | | |
| Pigment Dispersion Liquid 9 | | | | | | | | | |
| Pigment Dispersion Liquid 10 | | | | | | | | | |
| Pigment Dispersion Liquid 11 | | | | | | | | | |
| Pigment dispersion Liquid 12 | | | | | | | | | |
| Pigment Dispersion Liquid 13 | | | | | | | | | |
| Pigment Dispersion Liquid 14 | | | | | | | | | |
| Pigment Dispersion Liquid 15 | | | | | | | | | |
| Pigment Dispersion Liquid 16 | | | | | | | | | |
| Pigment Dispersion Liquid 17 | | | | | | | | | |
| Pigment Dispersion Liquid 18 | | | | | | | | | |
| Pigment Dispersion Liquid 19 | | | | | | | | | |
| Pigment Dispersion Liquid 20 | | | | | | | | | |
| Pigment Dispersion Liquid 21 | | | | | | | | | |
| Pigment Dispersion Liquid 22 | 20.0 | | | | | | | | |
| Pigment Dispersion Liquid 23 | | 20.0 | | | | | | | |
| Pigment Dispersion Liquid 24 | | | 20.0 | | | | | | |
| Pigment Dispersion Liquid 25 | | | | 6.7 | | | | | |
| Pigment Dispersion Liquid 26 | | | | | 6.7 | | 3.4 | | |
| Pigment Dispersion Liquid 27 | | | | | | 6.7 | 3.4 | | |
| Pigment Dispersion Liquid 28 | | | | | | | | 33.3 | |
| Pigment dispersion Liquid 29 | | | | | | | | | 6.7 |
| Glycerin | 2.5 | 2.5 | 2.5 | 2.5 | 2.5 | 2.5 | 2.5 | 2.5 | 2.5 |
| 2-Pyrrolidone | 2.5 | 2.5 | 2.5 | 2.5 | 2.5 | 2.5 | 2.5 | 2.5 | 2.5 |
| Polyethylene Glycol (*1) | 4.0 | 4.0 | 4.0 | 4.0 | 4.0 | 4.0 | 4.0 | 4.0 | 4.0 |
| 1,2-Hexanediol | | | | | | | | | |
| AcetylenolE100 (*2) | 0.5 | 0.5 | 0.5 | 0.5 | 0.5 | 0.5 | 0.5 | 0.5 | 0.5 |
| EMALEX 712 (*3) | | | | | | | | | |
| Ion-exchanged water | 70.5 | 70.5 | 70.5 | 83.8 | 83.8 | 83.8 | 83.8 | 57.2 | 83.8 |
| Pigment Content [%] | 2.0 | 2.0 | 2.0 | 2.0 | 2.0 | 2.0 | 2.0 | 2.0 | 2.0 |
| Polymer Content [%] | 1.00 | 1.00 | 1.00 | 1.00 | 1.00 | 1.00 | 1.00 | 0.00 | 1.00 |
| Pigment/Polymer Ratio (*4) | 2.0 | 2.0 | 2.0 | 2.0 | 2.0 | 2.0 | 2.0 | — | 2.0 |

(*1) Average Molecular Weight 1,000
(*2) Surfactant (Kawaken Fine Chemical Co.)
(*3) Polyoxyethylene Alkyl Ether: R = Lauryl, n = 12, HLB = 13 (Nippon Emulsion Co.)
(*4) Pigment content/Polymer content <Evaluation>

The ink obtained as above was filled in an ink cartridge. The cartridge was mounted on an ink jet recording apparatus BJ-F900 (Canon K.K.) which ejects ink by action of thermal energy. With this ink jet recording apparatus, recording was conducted with solid print portions at recording duties of from 10% to 200% by steps of 10% on a glossy recording medium (Super-photo-paper SP-101: Canon K.K.). The printer driver mode was selected to be in a photo paper pro mode. The setting of the photo paper pro mode was a below:
  Kind of paper: Photo Paper Pro
  Printing quality: Fine
  Color adjustment: Automatic
(Storage Stability)

The ink was enclosed tightly in a Shot bottle, and was stored in an oven at 60° C. for 2 weeks. The viscosities before and after the storage were measured with an E-type viscometer (RE80L: Toyo Seiki K.K.). The storage stability was evaluated by the percentage change of the viscosity by the storage in view the evaluation standards below. Table 3 shows the evaluation results. In the present invention, the stability of Level B or more is considered to be acceptable. Level A is excellent, Level AA is especially excellent, and Level C is not acceptable.

AA: The viscosity change is less than 10%
A: The viscosity change is 10% or more to less than 15%
B: The viscosity change is 15% or more to less than 30%
C: The viscosity change is 30% or more (Chroma)

One day after the recording, the chroma of a magenta image was measured with a tester Spectrolino (Gretag Macbeth Co.) for the evaluation. The chroma can be derived by the equation:

$$c^* = \{(a^*)^2 + (b^*)^2\}^{1/2}$$

The chroma was evaluated by the evaluation standard below. Table 3 shows the evaluation results. In the present invention, with the evaluation standard below, Level B or more is acceptable, Level A is excellent, Level AA is especially excellent, and Level C is not acceptable.

AA: is 83 or more
A: is 82 or more to less than 83
B: is 81 or more to less than 82
C: is less than 81

(Glossiness)

The glossiness level (20° gloss) of the recorded matter was measured with a microhazemater (BYK Gardner Co.). The glossiness level of the recorded matter was evaluated by the average of the glossiness level of the images formed at the prescribed duty levels. Table 3 shows the evaluation results. In the present invention, with the evaluation standard below, Level B or more is acceptable, Level A is excellent, Level AA is especially excellent, and Level C is not acceptable.

AA: The glossiness level (20° gloss) is 70 or more
A: The glossiness level (20° gloss) is 60 or more to less than 70
B: The glossiness level (20° gloss) is 50 or more to less than 60
C: The glossiness level (20° gloss) is less than 50

TABLE 3

| | | Evaluation Results | | |
|---|---|---|---|---|
| | | Storage Stability | Chroma | Glossiness |
| Examples | 1 | A | AA | A |
| | 2 | AA | A | A |
| | 3 | A | AA | A |
| | 4 | B | AA | A |
| | 5 | AA | A | A |
| | 6 | B | A | A |
| | 7 | B | AA | A |
| | 8 | A | AA | A |
| | 9 | B | A | A |
| | 10 | B | B | A |
| | 11 | B | AA | A |
| | 12 | B | AA | A |
| | 13 | A | AA | A |
| | 14 | A | AA | A |
| | 15 | A | AA | A |
| | 16 | A | AA | AA |
| | 17 | A | B | B |
| | 18 | A | AA | A |
| | 19 | B | AA | A |
| | 20 | A | AA | A |
| | 21 | A | AA | A |
| | 22 | B | AA | AA |

TABLE 3-continued

| | | Evaluation Results | | |
|---|---|---|---|---|
| | | Storage Stability | Chroma | Glossiness |
| Comparative Examples | 1 | A | C | C |
| | 2 | A | C | C |
| | 3 | C | AA | A |
| | 4 | AA | C | B |
| | 5 | B | C | A |
| | 6 | B | C | B |
| | 7 | B | C | A |
| | 8 | A | C | AA |
| | 9 | C | C | C |

The ink in Example 16 contains a polymer containing nonionic units. This ink gives the glossiness slightly more than other inks containing a polymer not containing the nonionic unit giving glossiness of Level A, and gives uniform recorded image. In Comparative Example 8, the operation of dispersion caused a change of the crystal structure of the solid solution to lower the chroma.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-024617, filed Feb. 5, 2009, and Japanese Patent Application No. 2010-004869, filed Jan. 13, 2010, which are hereby incorporated by reference herein in their entirety.

What is claimed is:

1. An ink comprising a pigment, wherein
the pigment comprises a solid solution of C.I. Pigment Red 202 and C.I. Pigment Violet 19, and
a primary particle diameter D (nm) of the pigment and a 50%-cumulative diameter $D_{50}$ (nm) in particle diameter distribution of the pigment satisfy a relation of D×0.95≦(=<)$D_{50}$≦(=<)130, and a 90%-cumulative diameter $D_{90}$ (nm) in particle diameter distribution of the pigment and the 50%-cumulative diameter $D_{50}$ (nm) satisfy a relation of 1.5≦(=<)$D_{90}/D_{50}$≦(=<)2.2, wherein the diameter D (nm) is 50 nm or more to 130 nm or less.

2. The ink according to claim 1, wherein the ink further comprises a polymer, the polymer having an acid value of 50 mgKOH/g or more to 300 mgKOH/g or less.

3. The ink according to claim 2, wherein the polymer has a nonionic unit.

4. The ink according to claim 2, wherein a content (mass %) of the pigment with respect to the total mass of the ink is 0.30 times or more to 10.0 times or less a content (mass %) of the polymer with respect to the total mass of the ink.

5. The ink according to claim 1, wherein the ink further comprises a 1,2-alkanediol and a polyoxyethylene alkyl ether.

6. An ink jet recording method comprising ejecting an ink by an ink jet system to perform recording on a recording medium, wherein the ink according to claim 1 is used as the ink.

7. An ink cartridge having an ink storage portion storing an ink, wherein the ink is the ink according to in claim 1.

8. An ink jet recording apparatus having an ink storage portion storing an ink and a recording head for ejecting the ink, wherein the ink according to claim 1 is used as the ink.

* * * * *